Figure 1:
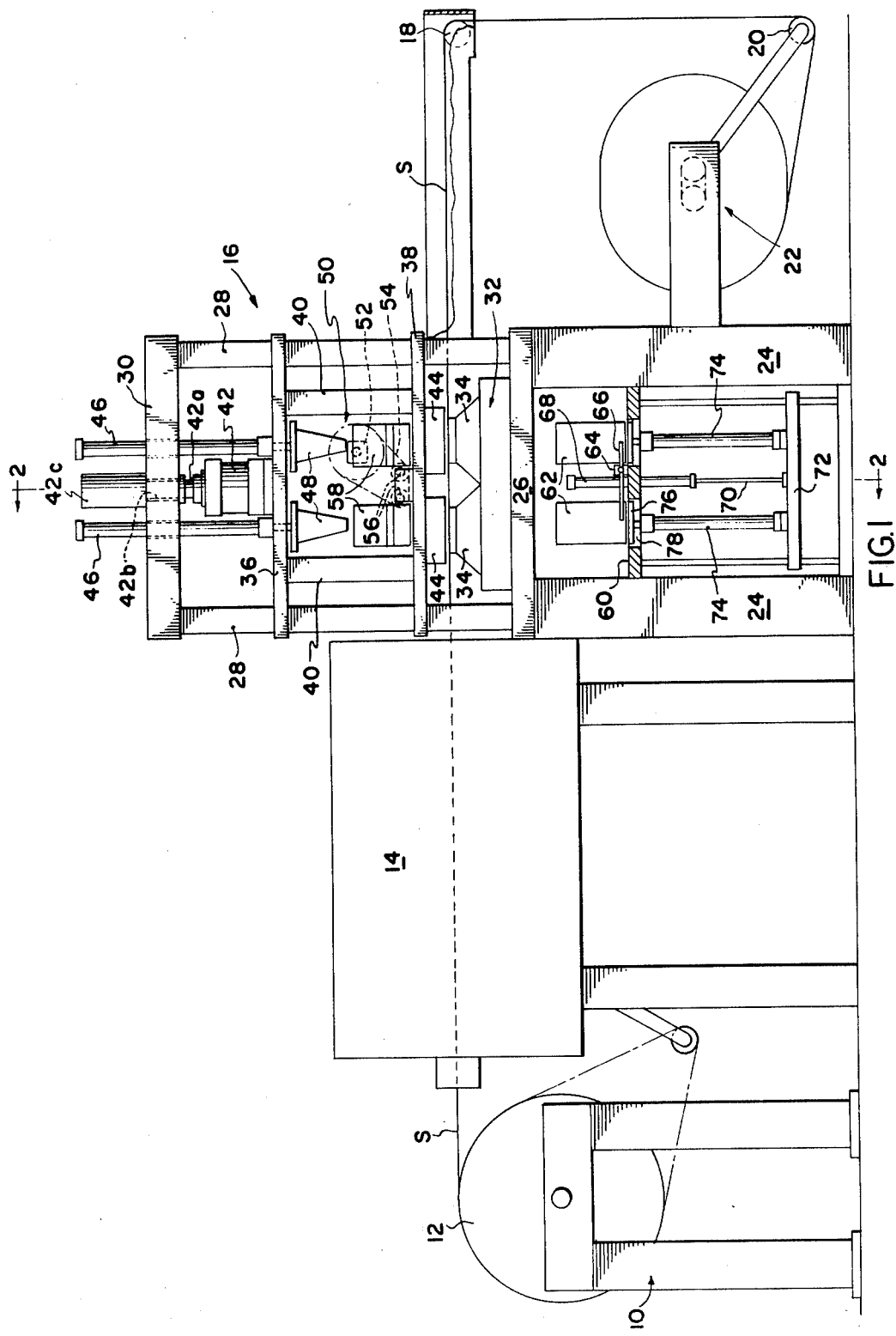

United States Patent [19]

West et al.

[11] 4,236,885
[45] Dec. 2, 1980

[54] CONTAINER LINING

[75] Inventors: George A. West, Clare; William F. Kent, Beaverton; George L. Pickard, Beaverton; Wilbur P. Winton, Beaverton, all of Mich.

[73] Assignee: Leesona Corporation, Beaverton, Mich.

[21] Appl. No.: 92,172

[22] Filed: Nov. 7, 1979

Related U.S. Application Data

[62] Division of Ser. No. 939,875, Sep. 5, 1978, Pat. No. 4,207,280.

[51] Int. Cl.³ .................... B29C 17/04; B29C 27/16
[52] U.S. Cl. ................................ 425/514; 425/503; 425/510; 425/515
[58] Field of Search ............... 264/516, 544, 549, 550, 264/553, 551, 153, 163, 269; 156/287; 425/503, 504, 510, 514, 515

[56] References Cited

U.S. PATENT DOCUMENTS

| 2,736,065 | 2/1956 | Wilcox | 264/553 X |
| 3,218,379 | 11/1965 | Edwards | 264/550 X |
| 3,445,892 | 5/1969 | Amberg et al. | 425/504 |
| 3,453,162 | 7/1969 | Turner | 264/553 X |
| 3,533,135 | 10/1970 | Christensson | 425/504 |

Primary Examiner—Jan H. Silbaugh
Attorney, Agent, or Firm—Learman & McCulloch

[57] ABSTRACT

A method and apparatus for lining the interior of a container with plastic sheet material. An open topped container is elevated upon a support through a passage in a lower die member into contact with the under surface of a sheet of heated thermoplastic material overlying the upper end of the passage. A plug assist member is then employed to deform the sheet into conformation with the interior of the container. Upon withdrawal of the plug assist member, an upper die member is lowered into shearing relationship with the lower die member to shear the sheet around the upper periphery of the container. The support, with the lined container in place, is then further elevated to raise the lined container upwardly through the opening thus sheared in the sheet and through a passage extending vertically through the upper die member. The plastic lined container is discharged from the apparatus by pushing it transversely across the flat upper surface of the upper die member.

4 Claims, 7 Drawing Figures

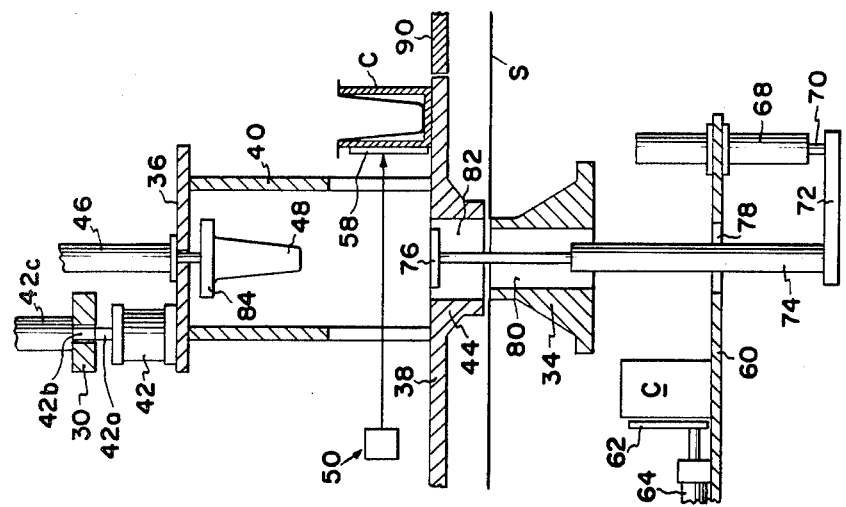
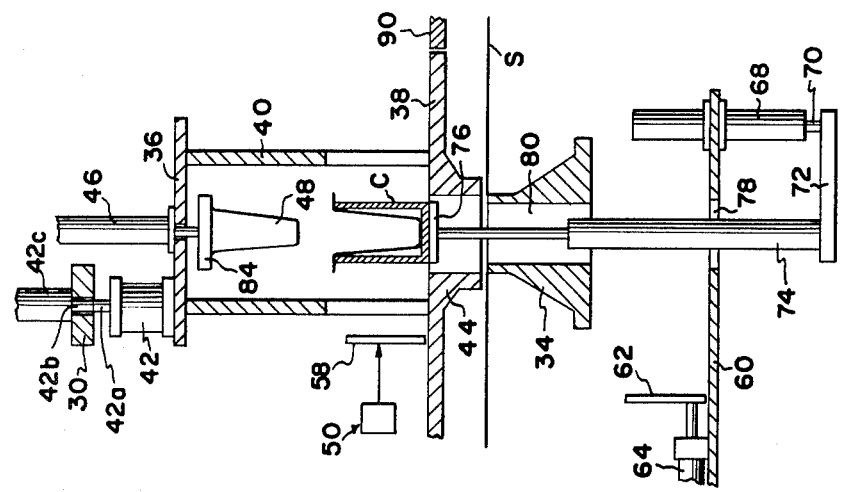
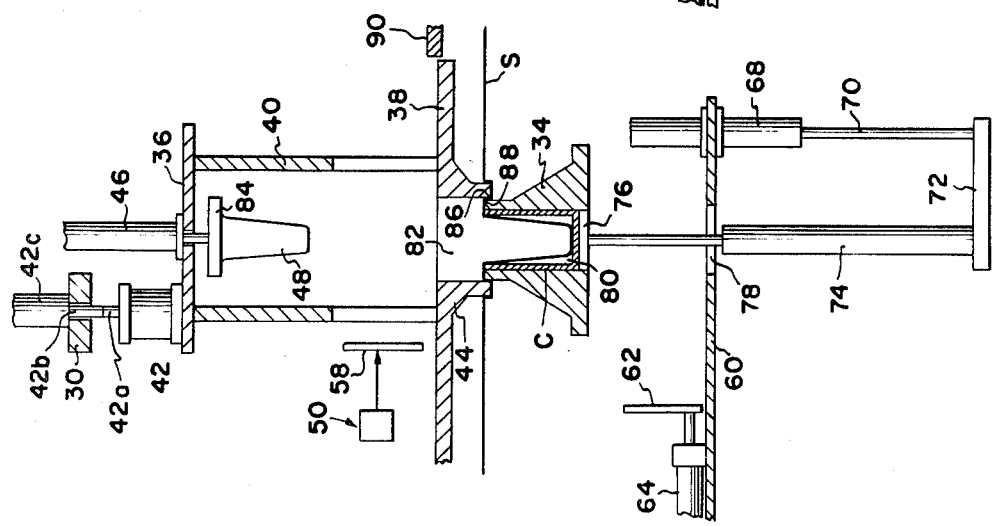

CONTAINER LINING

This is a division of application Ser. No. 939,875, filed in the U.S. Patent Office on Sept. 5, 1978, now U.S. Pat. No. 4,207,280 issued 6/10/80.

BACKGROUND OF THE INVENTION

The present invention is especially designed to apply an interior lining to a container, as for example, the application of a liquid-tight liner to the interior of a milk carton made of a material which is not thoroughly liquid or air tight. Lined containers of this type are not, per se, new, however, prior art techniques for installing a liner of thermoplastic sheet material, and particularly for subsequently separating the installed plastic liner from its parent web and removing the container, have in general been time consuming and cumbersome to the point where the cost advantage of the container materials is largely dissipated.

The present invention is especially directed to a method and apparatus for efficiently seating a liner of thermoplastic material in a relatively deep container and removing the lined container from the liner installing apparatus.

SUMMARY OF THE INVENTION

In accordance with the present invention, a stationary lower die member is formed with a vertical passage conformed to slidably receive container to be lined. An open topped container to be lined is elevated through the passage until the top of the container engages the under side of a heated sheet of thermoplastic lining material extending across the upper end of the passage. With the container held in this latter postion with its side walls supported by the passage and its bottom supported upon the support, a plug assist member is lowered from above the sheet to deform a portion of the deformable sheet downwardly into the container and to conform the sheet to the container interior as by the discharge of air under pressure from passages in the plug assist member. The plug assist member is guided into the container interior by an upper die member aligned with the lower die maker, the upper die member having a vertical passage extending entirely through the member to slidably guide the plug assist member. After the liner has been seated, the plug assist member is withdrawn and the lower die member is lowered slightly to shear the liner portion from the sheet of thermoplastic material by cooperating shearing surfaces on the two die members which are located to extend around the upper periphery of the container.

The lined container is then elevated by its support member through the opening thus formed in the thermoplastic sheet and upwardly through the passage in the upper die member until the container bottom is located at the level of the upper surface of the upper die member. At this time, a pusher member is driven across the upper surface of the upper die member to push the lined container from its support transversely across the flat upper surface of the upper die member to discharge the lined container from the apparatus.

Other features and advantages of the invention will become apparent by reference to the following specification and to the drawings.

IN THE DRAWINGS

FIG. 1 is a side elevational view of an apparatus embodying the present invention; and FIGS. 2 through 7 inclusive are schematic diagrams, approximating a cross-sectional view of the machine taken on line 2—2 of FIG. 1 showing successive steps in the operation of the apparatus.

Referring first to FIG. 1, apparatus embodying the present invention includes a sheet supply station designated generally 10 which rotatably supports a roll 12 of thermoplastic sheet materials. Sheet material from roll 12 passes horizontally from the roll through an oven 14 which heats the web of material passing through the oven to a predetermined temperature to enable deformation of the sheet in the container lining process. From oven 14, the web of sheet material passes horizontally through the container lining and handling portion of the apparatus, designated generally 16, and then passes around guide rolls 18 and 20 to be wound up upon a sheet winder designated generally 22.

The container lining and handling portion 16 of the apparatus has a fixed frame which includes a plurality of legs 24 upon which is fixedly secured a table 26. A plurality of vertical posts 28 project upwardly from table 26 to fixedly support an upper cross-frame member 30 at their upper ends. A lower die and guide assembly designated generally 32 is fixedly mounted on table 26 and, in the disclosed embodiment, detachably and fixedly mounts a pair of lower die-guide members 34, described in greater detail below, in side-by-side relationship.

Vertical posts 28 support an upper die carrying frame which includes a pair of vertically spaced cross-frame members 36 and 38 slidably received upon posts 28. Upper and lower cross-frame members 36 and 38 are rigidly interconnected to each other by posts 40. The entire upper die carrying frame constituted by members 36, 38 and 40 is coupled to the fixed frame of the apparatus by a differential pressure motor designated generally 42 whose cylinder is fixedly secured to upper frame member 36 of the die carrying frame and whose piston rod 42a extends through an opening in the upper cross-frame member 30 of the fixed frame of the machine into engagement with the piston rod 42b of a like motor or cylinder 42c whose cylinder is fixed to frame member 30. Upper die members 44 are mounted in opposed operative relationship to lower die and guide members 34, members 44 being detachably and fixedly secured to the lower cross-frame member 38 of the vertically slidable die carrying frame.

The cylinders of a pair of plug assist motors 46 are fixedly mounted on upper cross-frame member 36 and a pair of plug assist members 48 are carried by the respective piston rods of motors 46.

Also mounted upon the upper die carrying frame is an ejector assembly designated generally 50 which includes a reversible electric motor 52 which drives in rotation, by a belt and pulley arrangement designated generally 54, a pair of horizontally extending lead screws 56. When rotated by operation of motor 52, lead screws 56 drive a pair of pusher elements 58 horizontally in a direction toward and away from the observer in FIG. 1 to eject lined containers from the apparatus in a manner to be described in greater detail below.

A container receiving platform 60 is fixedly mounted on legs 24 beneath table 26. A pair of container pusher elements 62 are slidably mounted and guided upon the upper surface of platform 60 for movement toward and away from the observer as viewed in FIG. 1. A pusher motor 64 has its cylinder fixedly mounted on platform 60, the piston rod of motor 64 being coupled to pusher elements 62 as by a bracket 66 so that extension and retraction of the piston rod of motor 64 will shift the pusher elements 62 across platform 60 in a manner to be described in greater detail below.

The cylinder of a container eject motor 68 is fixedly mounted in a vertical position upon platform 60 and has its piston rod 70 coupled to a support platform 72 which is slidably guided in vertical movement by legs 24.

Support platform 72 supports the vertically disposed cylinders of a pair of container elevating motors 74 whose piston rods support respective container support platforms 76. Upon retraction of piston 70 of eject motor 68, platform 72 and the two container elevating motors 70 are elevated bodily from the position shown in FIG. 1, openings 78 being provided in platform 60 to accommodate passage of the cylinders of motors 74 vertically through platform 60.

Referring to the schematic diagrams of FIGS. 2 through 7, which show successive steps in the operation of the machine, and wherein only one liner is being formed each time for the sake of convenience of illustration, it is seen (FIG. 2) that lower die member 34 is formed with a central vertical guide passage 80 which extends completely through member 34. Passage 80 is dimensioned to slidably receive and guide a container C which is to be lined, and also will slidably receive the container support platform 76.

A slightly wider passage 82 is lined with passage 80 and extends vertically through upper die member 44, the somewhat greater width of passage 82 slidably receiving a guide plate 84 on plug assist member 48 and also enabling the die members to move into vertically overlapping relationship.

The lower end of passage 82 in upper die member is formed with a shearing edge 86 which is cooperable with a shearing edge 88 at the upper end of lower die member 34.

Figure 2:
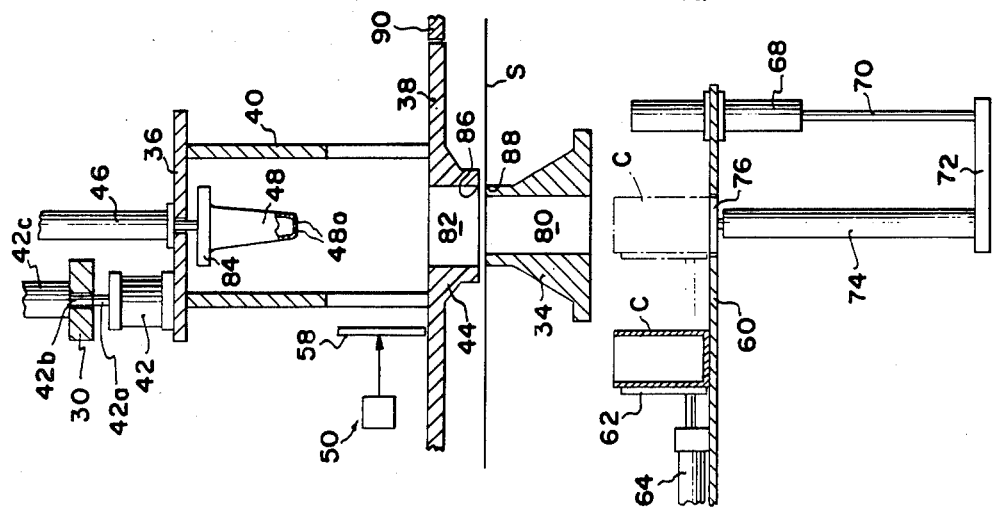

In FIG. 2, the apparatus is shown ready to commence the first step of the container lining operation. The sheet S of thermoplastic material is trained across the upper end of lower die member 34 in contact with the upper surfaces of die member 34 and extending across the upper end of guide passage 80. An unlined container C has been positioned upon container receiving platform 60 and is positioned in front of pusher member 62. At this particular time, the piston rods of all of the various differential pressure motors are in their retracted position, with the exception of container ejecting motor 68 which, as shown, is fully extended. The lead screw driven ejecting pusher member 58 is in what would be analogous to a retracted position, were this member driven by a differential pressure motor.

As a first step in the operation, motor 64 is actuated to extend its piston rod to thus cause pusher member 62 to push container C from the full line position shown in FIG. 2 onto container support platform 76. The piston rod of motor 64 is then retracted and remains retracted throughout the rest of the cycle. A new unlined container may be manually loaded in position in front of the retracted pusher 62.

Figure 3:
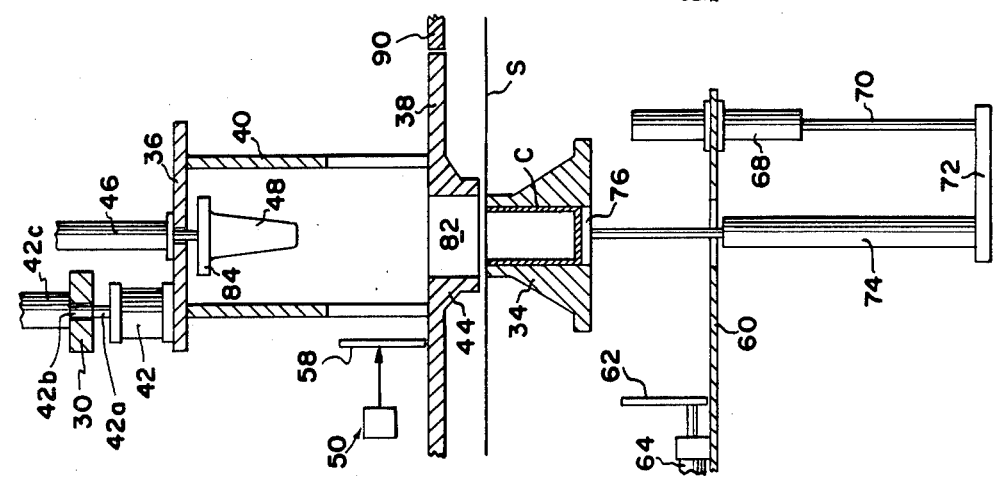

After the container C has been positioned upon support platform 76, container elevating motor 74 is actuated to extend its piston rod. The stroke of motor 74 is such that when its piston rod is fully extended, the container is positioned within guide passage 80 of lower die member 34 with the open upper end of the container lightly contacting the under surface of the sheet of thermoplastic material S, as shown in FIG. 3.

Figure 4:
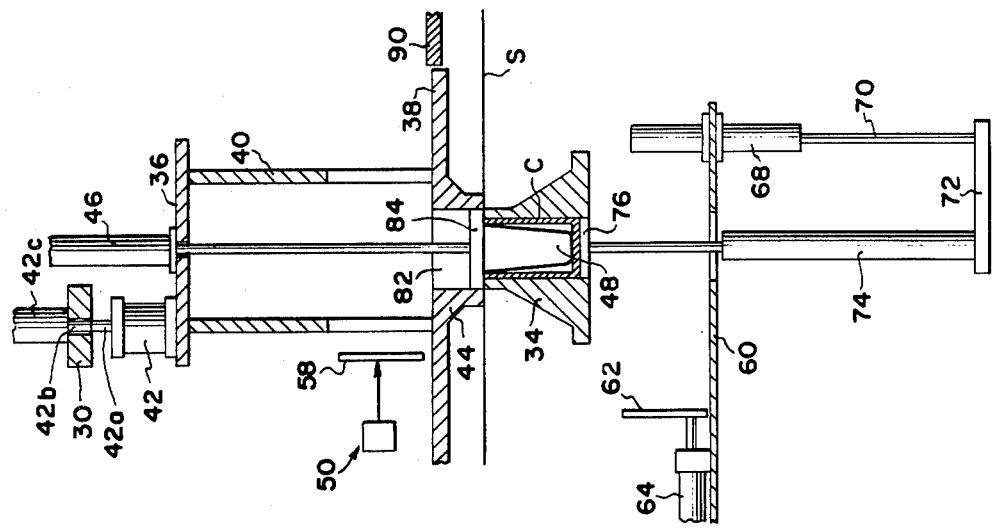

With the container so positioned, motor 46 is actuated to extend its piston rod to drive the plug assist member 48 downwardly through passage 82 to form the sheet material downwardly into the interior of the container as shown in FIG. 4. At the same time motor 42 is actuated and, because rod 42a cannot move upwardly, cylinder 42 moves downwardly to move upper die 44 into clamped sealed relationship with the sheet S before plug assists 48 contact the sheet. As previously explained, prior to being fed to the guide assembly, the sheet of thermoplastic material is heated during its passage through oven 14. Plug assist member 48 is also heated to a temperature such that during the operation indicated in FIG. 4, the thermoplastic material of sheet S is easily deformed as shown. Plug assist member 48 is maintained at a controlled temperature by means well-known to those skilled in the art, and is also provided with air passages 48a to apply pressure to the liner to conform the thermoplastic material to the interior of container C. The material from which the unlined container C is formed is normally a relatively porous material which is not air-tight, hence air trapped between the container wall and the air-tight liner material can vent through the container walls.

After a suitable interval for cooling, plug assist member 48 is retracted to the position shown in FIG. 5 and, just prior to this, motor 42c is actuated to extend its piston rod 42b downwardly an increment to drive ram 42 and upper die member 44 downwardly into vertically overlapped relationship with the upper end of lower die member 34. The cooperating shearing edges 86 and 88 on the two die members shear the web of sheet S around the upper periphery of the container, thus separating the now conformed liner within the container from the remainder of the sheet. Motor 42c is then actuated to retract its piston rod 42b, and motor 42 is actuated simultaneously to restore upper die member 44 to its original vertically spaced relationship with lower die member 34.

On the completion of the shearing step, eject motor 68 is actuated to retract its piston rod 70, thus elevating support platform 72 and motor 74, whose piston rod remains extended. This action, illustrated in FIG. 6, elevates the lined container by passing it upwardly through the opening sheared in sheet S in the previous step and upwardly through passage 82 in upper die member 44 until the lined container is located with its bottom at the level of the horizontal upper surface of upper guide member 44.

The final step in the cycle is the actuation of the ejecting mechanism 50 to drive pusher 58 horizontally across the upper surface of upper die member 44 to push the container from support platform 76 across the upper surface of upper die member 44 onto a takeout device partially indicated at 90 which can take the form of a turntable. Pusher member 58 is retracted as soon as it reaches the fully extended position. At this time motor 74 is actuated to retract its piston rod and motor 68 is actuated to extend its piston rod 70 to return support platform 76 to its original container receiving position of FIG. 2, at which time the cycle described above may be repeated.

While one embodiment of the invention has been described in detail, it will be apparent to those skilled in the the art that the disclosed embodiment may be modified. Therefore, the foregoing description is to be considered exemplary rather that limiting, and the true scope of the invention is that defined in the following claims.

What is claimed is:

1. Apparatus for applying a liner of thermoplastic sheet material to the interior of an open ended container comprising opposed die members having aligned passages therethrough and cooperating shearing surfaces adjacent the peripheries of the opposed ends of said passages, said die members being movable relative to one another between spaced open position and overlapped shearing position, sheet support means for supporting a web of thermoplastic sheet material extending between said die members when said members are in their open position, reciprocable container support means for advancing an open ended container through the passage in one die member into a ready position adjacent said web, plug assist means movable through the passage in said other die member for deforming the web of sheet material into lining relationship with the interior of the container at said ready position, die actuating means for moving said die members to said shearing position to shear the container lining portion of the web from the remainder of the web, and container ejecting means for moving said support means to pass the lined container through the opening thus sheared in said web through the passage in said other die member to an eject position.

2. Apparatus for applying a liner of thermoplastic sheet material to the interior of an open topped container comprising opposed upper and lower die members having aligned vertical passages therethrough and cooperating shearing surfaces adjacent the peripheries of the opposed ends of said passages, said die members being vertically movable relative to one another between a normally maintained vertically spaced open position and a vertically overlapped shearing position, sheet support means for supporting a web of thermoplastic sheet material extending between said die members when said members are in their open positions, vertically reciprocable container support means for advancing an open topped container upwardly through the passage in said lower die member into a ready position in contact with the under surface of said web, vertically reciprocable plug assist means movable downwardly through the passage in said upper member for deforming the web of sheet material into lining relationship with the interior of an open topped container at said ready position, die actuating means for moving said die members to said shearing position to shear the container lining portion of the web from the remainder of the web, and container ejecting means for elevating said support means to pass the lined container upwardly through the opening thus sheared in said web and through the passage in said upper die member to an eject position at the upper end of the last-mentioned passage.

3. Apparatus as defined in claim 2 wherein said container support means comprises a container support platform and first piston-cylinder means operable to elevate said platform between a container receiving position spaced below the lower end of the passage in said lower die member by a distance greater than the height of a container and an extended position wherein said platform supports the container in said ready position, and said ejecting means comprises second piston-cylinder means for raising and lowering said first piston-cylinder means.

4. Apparatus as defined in claim 2 wherein said upper die member has a flat upper surface, and pusher means movable transversely across said upper surface for pushing a container at said eject position transversely across said upper surface to discharge the container from said apparatus.

* * * * *